3,792,164
OPHTHALMIC COMPOSITION COMPRISING WATER-SOLUBLE ALKALOID SALTS OF POLYURONIC ACIDS
Arthur W. Bechtold, Boonton, N.J., assignor to Chemway Corporation, Wayne, N.J.
No Drawing. Continuation-in-part of application Ser. No. 561,325, June 29, 1966. This application Mar. 31, 1970, Ser. No. 24,352
Int. Cl. A61k 27/00
U.S. Cl. 424—180
1 Claim

ABSTRACT OF THE DISCLOSURE

Water-soluble salts are provided by reacting in aqueous solution approximately equivalent amounts of a polyuronic acid selected from the group consisting of polymannuronic acid, polyglucuronic acid and polygalacturonic acid and an alkaloid, selected from the group consisting of pilocarpine, atropine, eserine, ephedrine, benoxinate, chlorpheniramine, procaine, tetracaine, cocaine, phenylephrine, homatropine, amphetamine and epinephrine. The water-soluble salts are useful in the preparation of anesthetics, antihistamines, vasoconstrictors, miotics and mydriatics. Of particular importance to the invention, is the fact that when in solution such salts provide a dramatic increase in the duration of therapeutic activity which may be achieved, particularly with regard to miotics and mydriatics.

CROSS-REFERENCE TO RELATED APPLICATION

This application is a continuation-in-part of copending application Ser. No. 561,325 filed June 29, 1966 now abandoned.

BACKGROUND OF THE INVENTION

This invention relates to water-soluble alkaloid salts of polyuronic acids, to therapeutic preparations containing them and to methods for their manufacture.

Aqueous solutions of alkaloids are well known in the art. In general, they have been used in the form of their hydrochloride or sulfate salts but as such they have proved to be unsatisfactory in those cases requiring prolonged contact with a treated area.

For instance, pilocarpine, atropine and eserine have long been known to have ophthalmic properties; pilocarpine and eserine possess miotic activity and atropine possesses mydriatic activity. They have been used as aqueous solutions of the hydrochloride salt in the treatment of certain eye disorders, such as glaucoma and iritis, where it is often desirable that the ophthalmic preparation be in prolonged contact with the eye, as for example, overnight. Because pilocarpine hydrochloride, etc. per se are not suited for such prolonged contact they have been incorporated into ointments. Ointments, however, are inconvenient to use and the active material is merely suspended in the ointment base. More recently, aqueous isotonic solutions containing the active material together with water-soluble thickening agents, such as methylcellulose and carboxymethylcellulose, have been employed but in such preparations the active material is merely dissolved in the thickened solution.

The alkaloids cocaine, tetracaine, procaine, and benoxinate have long been known to possess local anesthetic activity and have been used in the form of aqueous solutions of the hydrochloride and other salts, of both organic and inorganic acids. In treatments utilizing local anesthetics, it is often desirable that the therapeutic preparation be in prolonged contact with the skin or body surface. For this reason, the active materials have often been incorporated into jellies and ointments. But, as previously mentioned, ointments and jellies are troublesome to use and the active material is only suspended in the jelly and ointment base or carrier. The solutions for direct injection into the body surface area are merely preparations in which the active material has been dissolved.

Epinephrine, phenylephrine and amphetamine possess vasoconstrictor activity and have been used in aqueous solutions, in the form of the sulfate, etc. The solutions are usually injected intravenously or intramuscularly, or taken orally.

Chlorpheniramine possesses antihistaminic activity. The alkaloid has been used in aqueous solutions which are usually taken orally or injected intravenously or intramuscularly.

SUMMARY OF THE INVENTION

It has now been discovered that alkaloids selected from the group consisting of pilocarpine, atropine, eserine, ephedrine, benoxinate, chlorpheniramine, procaine, tetracaine, cocaine, phenylephrine, homatropine, amphetamine and epinephrine, which are relatively water-insoluble, form water-soluble salts with a polyuronic acid selected from the group consisting of polymannuronic acid, polyglucuronic acid and polygalacturonic acid, all of which are substantially water-insoluble, and that when compared to solutions of the prior art such water-soluble salts when in a solution provide a dramatic increase in the duration of therapeutic activity of the alkaloid substituents. Moreover, solutions containing the salts of this invention are less viscous than the prior solutions thickened with methylcellulose or other gums. A particularly important part of the present invention is the discovery that the water-soluble salts formed from the reaction of pilocarpine, atropine, eserine, homatropine, phenylephrine and ephedrine with the polyuronic acids, when in aqueous isotonic solutions, are very effective in providing prolonged treatment for miotic and mydriatic conditions.

DETAILED DESCRIPTION OF THE PREFERRED EMBODIMENTS

As previously mentioned, the compositions of the present invention are produced by reacting approximately equivalent amounts of selected alkaloids with a polyuronic acid selected from the group consisting of polymannuronic acid, polyglucuronic acid and polygalacturonic acid.

Polymannuronic acid and polyglucuronic acid are commercially available and are polymers of mannuronic acid and glucuronic acid, respectively. D-mannuronic acid has the following structure:

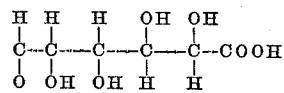

D-glucuronic acid has the following structure:

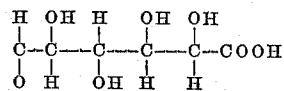

Both polyglucuronic acid and polymannuronic acid are insoluble in water. Polygalacturonic acid is also available commercially in molecular weights ranging from 26,000 to 75,000 so that the viscosity of the salts of this invention can be varied to some extent by selection of the polygalacturonic acid, according to its molecular weight. Polygalacturonic acid is a white amorphous carbohydrate material obtained by the deesterification of pectin, and has the following structure:

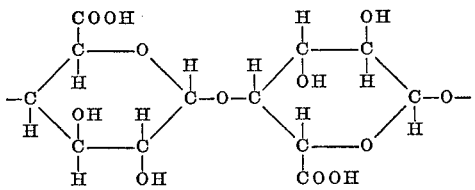

It is insoluble in both water and organic solvents and forms soluble alkali metal salts and insoluble salts with the alkaline earths and heavy metals. The base molecular weight of the polygalacturonic acid monomer (one-half of the above formula) is 176, and equals 75 to 200 in commercial polymers.

The alkaloids used in forming the salts of the present invention include atropine, homatropine, phenylephrine, ephedrine, physostigmine (eserine) pilocarpine, chlorpheniramine, amphetamine, cocaine, procaine, tetracaine and benoxinate. Atropine, homatropine, phenylephrine and ephedrine act as mydriatics. A mydriatic is any drug or agent that causes dilation of the pupil of the eye.

Atropine is dl-tropyl tropate, $C_{17}H_{23}NO_3$, which is extracted from *Atropabelladonna L.* Homatropine $$(C_{16}H_{21}NO_3)$$

is an alkaloid (mandelyltropeine) obtained by the condensation of tropine and mandelic acid. Phenylephrine is l-m-hydroxy - $\alpha$ - (methylaminomethyl)benzyl alcohol, $C_{19}H_{13}NO_2$. Ephedrine is 1-phenyl-2-methylaminopropanol, $C_{10}H_{15}NO$, which is usually produced by synthesis, e.g., see Neuberg et al., Biochem. Z. 115, 282 (1921), 128, 610 (1922). Other examples of mydriatics are given in Physicians Desk Reference to Pharmaceutical Specialties and Biologicals, Medical Economics, Inc., Oradell, N.J., 1965, for example, see page 247. [Also see the Quarterly Supplement to Physicians' Desk Reference, No. 2, April, 1966.] The mydriatics in the aforementioned reference, to be useful in this invention, must be in the basic form and usually free of carriers, etc., except for water.

A miotic is any drug or agent that causes the pupil to contract. Physostigmine and pilocarpine exhibit miotic activity. Physostigmine is eserine, $C_{15}H_{21}N_3O_2$, which is obtained by synthesis, see Pikl, Jr., J. Am. Chem. Soc., 57, 755 (1935). Pilocarpine, $C_{11}H_{16}N_2O_2$, is an alkaloid obtained from the leaves of *Pilocarpus microphyllus* and other P. species. Other examples of miotics are given in Physicians' Desk Reference to Pharmaceutical Specialties and Biologicals, Medical Economics, Inc., Oradell, N.J., 1965, for example, see page 246. The miotics in the aforementioned reference, to be useful in this invention, must be in the basic form and usually free of carriers, etc., except for water.

An antihistaminic is any drug or agent that counteracts the action of histamine. Compounds that act as antihistaminics include chlorpheniramine. Chlorpheniramine is 2-[p-chloro - $\alpha$ - (2-dimethylamino-ethyl) benzyl]pyridine, $C_{16}H_{19}ClN_2$, which can be prepared by the synthesis method given in U.S. Patent No. 2,676,964. Other examples of antihistaminics are given in Physicians' Desk Rereference to Pharmaceutical Specialties and Bioligicals, Medcal Economics, Inc., Oradell, N.J., 1965, for example, see pages 211 and 212.

A vasoconstrictor is any drug or agent (motor nerve or chemical compound) that causes constriction of the blood vessels. Compounds that act as vasoconstrictors include epinephrine, phenylephrine and amphetamine. Amphetamine is 1-phenyl-2-aminopropane, $C_9H_{13}N$, which can be prepared from the method given in U.S. Pat. No. 1,879,003. Epinephrine is 3,4-dihydroxy-$\alpha$-(methylaminomethyl) benzyl alcohol, $C_9H_{13}NO_3$. Other examples of vascoconstrictors are given in Physicians' Desk Reference to Pharmaceutical Specialties and Biologicals, Medical Economics, Inc., Oradell, N.J., 1965, for example, see pages 268 and 269. The vasoconstrictors in the aforementioned reference, to be useful in this invention, must be in the basic form and usually free of carriers, etc., except for water.

A local anesthetic is any drug or agent that is used to abolish the feeling or sensation of pain where this action is limited to an area of the body around the site of its application. Compounds that act as anesthetics include cocaine, procaine, tetracaine, and benoxinate. Procaine is 2-diethylamino ethyl-p-amino-benzoate, $C_{13}H_{20}N_2O_2$, which can be obtained by a method divulged in U.S. Pat. No. 812,554. Benoxinate is 2-diethylaminoethyl 4-amino-3-butoxybenzoate, $C_{17}H_{28}N_2O_3$. Tetracaine is p-butyl-aminobenzoyl-2-dimethyl aminoethanol. Cocaine is 2$\beta$-carbomethoxy-3$\beta$-benzoxytropane, $C_{17}H_{21}NO_4$, which can be synthesized by a method given in Findlay, J. Am. Chem. Soc. 76, 2855, 1954). Other examples of local anesthetics are given in Physicians' Desk Reference to Pharmaceutical Specialties and Biologicals, Medical Economics, Inc., Oradell N.J. 1965, for example, see pages 206 and 207. The local anesthetics in the aforementioned reference, to be useful in this invention, must be in the basic form and usually free of carriers, etc., except for water.

The salts of this invention are formed by mixing the water-insoluble acids with an aqueous solution or suspension of the alkaloid base in approximately equivalent molecular proportions. The reaction proceeds at room temperature, although somewhat higher or lower temperatures can be employed, and at normal atmospheric pressures.

The pH of the aqueous admixture or dispersion of polyuronic acid is about 3.0 and upon addition of the base, the pH is raised. The slope of the curve defined by pH as the ordinate and the concentration of base as the abcissa is greatest within a pH range of about 4.0 to 8.0 and this is the range where the salt concentration in the solution is greatest. For ophthalmic preparations, however, an excess of base is often desirable and hence the pH can range up to about 7.5, or even greater, such as up to about 9.0. Such solutions can be made isotonic by addition of sodium chloride or other salts.

The new compositions of this invention can include preservatives such as phenyl mercuric acetate, phenyl mercuric nitrate, and thimerosal, and antioxidants such as sodium sulfite or sodium bisulfite.

Unless other wise indicated all amounts and proportions of materials are expressed on a weight basis throughout this specification and the appended claims.

This invention is illustrated by the following examples:

EXAMPLE I

Into a one-liter flask containing about 0.3 liter of distilled water were introduced with stirring 4.45 grams of pilocarpine alkaloid, 4.2275 grams of polygalacturonic acid, 0.05 gram of thimerosal and additional distilled water to bring the total volume to 0.5 liter. The mixture was stirred slowly for about ten minutes and resulted in a clear solution which after standing about one week had a pH of 5.65 and assayed 0.92 percent pilocarpine as its polygalacturonate salt, i.e., 108 percent of the theoretical value.

This sample was designated B–786 for miotic test purposes and was instilled in the left eye of a cat having a normal pupil measurement of 9 millimeters. Immediately after installation, the eyelid was held closed for a period of about ten seconds and subsequent pupil measurements were taken over a period of about two days. Onset of miotic activity was first recorded after a lapse of about 20 minutes, at which time the pupil measured 7.5 millimeters. Maximum construction was recorded about one hour and ten minutes after installation, at which time an accurate pupil measurement could not be taken but was estimated at 1.5 milliemeters by two observers. The duration of the constriction lasted for a maximum period of approximately nine hours.

EXAMPLE II

Two grams of pilocarpine were dissolved in 0.1 liter of distilled water, and sufficient dilute hydrochloric acid added to adjust the pH to 7.2. To this solution were then added 1.4 gram of sodium chloride and sufficient distilled water to provide 0.2 liter of solution. Benzalkonium chloride in the amount of one part to 10,000 parts of solution was added as a preservative. This was sample R-751 and assayed 104 percent of the theoretical amount of pilocarpine.

A drop of the pilocarpine polygalacturonate solution, B-786 was instilled into the eye of a cat and a drop of the pilocarpine hydrochloride solution, R-751, was instilled into the other eye of the cat. The pilocarpine polygalacturonate solution produced a dramatic increase in miotic response when compared to the pilocarpine hydrochloride solution. The difference in miotic response could be observed with the naked eye for four hours.

EXAMPLE III

Into a one-liter flask containing 0.3 liter of distilled water were introduced, with stirring 0.492 gram of phenylephrine base, 0.05 gram of sodium bisulfite, 0.05 gram of thimerosal, 4.4 grams of sodium chloride and 0.6 gram of polygalacturonic acid. Additional distilled water was added to bring the total volume to 0.5 liter. The mixture was stirred slowly for about ten minutes, resulting in a clear colorless solution having a pH of 5.0.

EXAMPLE IV

Into a one-liter flask containing 0.3 liter of distilled water were introduced, with stirring, 3.85 grams of homatropine, 3.20 grams of polygalacturonic acid 0.05 gram of thimerosal and additional distilled water to provide a total volume of 0.5 liter. The mixture was stirred slowly and the reaction was complete in about ten minutes, rendering a clear solution, having a pH of 5.5 which assayed 0.766 percent homatropine as its polygalacturonate salt. After a period of several weeks the pH of the solution was 5.2.

EXAMPLE V

Into a ½-liter flask, containing about 0.17 liter of distilled water, were added 0.1 gram of sodium bisulfite, 1.0 gram of epinephrine base, 1.2 gram of polygalacturonic acid, 0.01 gram of thimerosal and additional distilled water to bring the total volume to 0.1 liter. The mixture was stirred slowly for about ten minutes, at which time the reaction was complete, rendering a clear colorless solution, having a pH of 5.0. Four days later the solution assayed 0.988 percent of epinephrine as its polygalacturonate salt, and had a pH of 4.65 [Note: The solution turned blackish in about one week, so it is recommended that the solution be stored under a nitrogen atmosphere.]

EXAMPLE VI

Into a one-liter flask containing 0.1 liter of distilled water were introduced equivalent amounts of chlorpheniramine and polygalacturonic acid, as weighed in grams to four decimal places. The reaction was allowed to come to completion at this relatively high concentration. The solution was then diluted with additional distilled water to bring the total solution to 0.5 liter and 0.05 gram of thimerosal (0.01 percent) were added. The solution assayed at 0.5 percent chlorpheniramine as its polygalacturonate salt.

EXAMPLE VII

Into a one-liter flask containing 0.1 liter of distilled water were introduced equivalent amounts of atropine and polygalacturonic acid, as weighed in grams to four decimal places. The reaction was allowed to come to completion at this relatively high concentration. The mixture was then diluted with additional distilled water to bring the total solution to 0.5 liter and 0.01 percent thimerosal was added. The solution assayed at 0.43 percent atropine as its polygalacturonate salt and had a pH of 7.0. After seven days, the pH had dropped to 6.6 and upon measurement at an age of twelve days, the solution was found to have a pH of 6.2.

EXAMPLE VIII

Into a one-liter flask containing about 0.3 liter of distilled water, were introduced 1.6 gram of benoxinate base, one gram of polygalacturonic acid, 0.04 gram of thimerosal and additional distilled water to bring the total solution to 0.4 liter. Upon a time interval of thirty minutes, the reaction was complete, giving a clear solution having a pH of 4.8. The solution assayed 0.4 percent benoxinate as its polygalacturonate salt.

EXAMPLE IX

Into a one-liter flask containing about 0.3 liter of distilled water, were introduced with stirring 5 grams of ephedrine alkaloid anhydrous, 7 grams of polygalacturonic acid, 0.05 gram of thimerosal and additional distilled water to bring the total volume to 0.5 liter. The mixture was stirred slowly for thirty minutes, at which time the reaction was complete, giving a clear solution having a pH of 4.7. The solution assayed one percent ephedrine as its polygalacturonate salt.

EXAMPLE X

Pilocarpine polygalacturonate was prepared by dissolving 4.25 grams of pilocarpine alkaloid in 0.3 liter of distilled water, adding 4.2275 grams of polygalacturonic acid, adding 0.05 gram of thimerosal (0.01 percent) and 3.35 grams of potassium chloride, and then adding additional distilled water to provide a total volume of 0.5 liter. The pH of the solution was 5.2. After five days, the solution had a pH of 5.33. The solution was sample B-793 and assayed to 0.792 percent pilocarpine as its polygalacturonate salt.

The principle, preferred embodiments and modes of operation of the present invention have been described in the foregoing specification. However, it should be understood that the invention which is intended to be protected herein may be practiced otherwise than as described without departing from the appended claim.

The following is claimed:

1. An ophthalmic composition having an increased duration of activity containing an ophthamically effective amount of an isotonic aqueous solution of a material selected from the group consisting of atropine polygalacturonate, pilocarpine polygalacturonate, homatropine polygalacturonate, phenylephrine polygalacturonate, ephedrine polygalacturonate and eserine polygalacturonate.

References Cited

UNITED STATES PATENTS

| | | | |
|---|---|---|---|
| 2,878,252 | 3/1959 | Halpern | 260—284 |
| 2,275,809 | 3/1942 | Roberts | 260—501 |
| 3,450,814 | 6/1969 | Bechtold et al. | 424—180 |

OTHER REFERENCES

Chemical Abstracts, vol. 52 (1958), p. 5758b.

VINCENT D. TURNER, Primary Examiner

U.S. Cl. X.R.

424—265, 273, 274, 330; 260—209.6